July 5, 1966   R. H. STEIDL   3,259,341
BLOWN MOVABLE AIRFOIL
Filed May 7, 1964   2 Sheets-Sheet 1
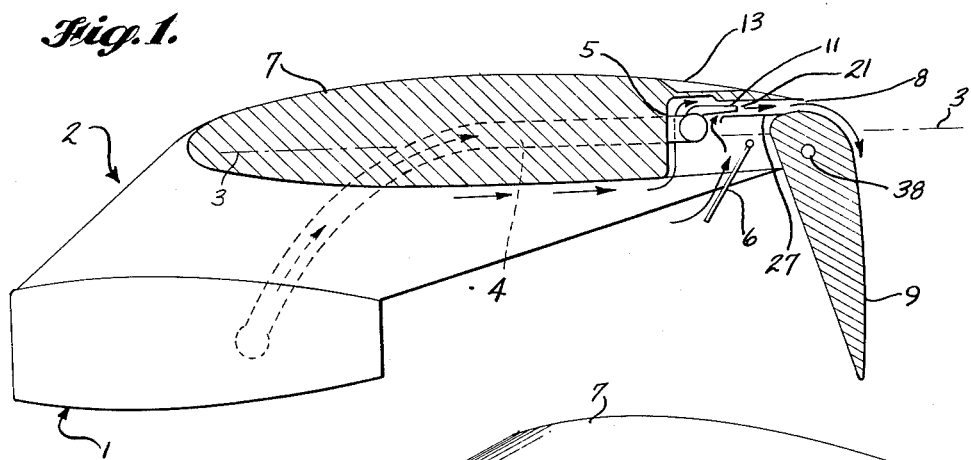
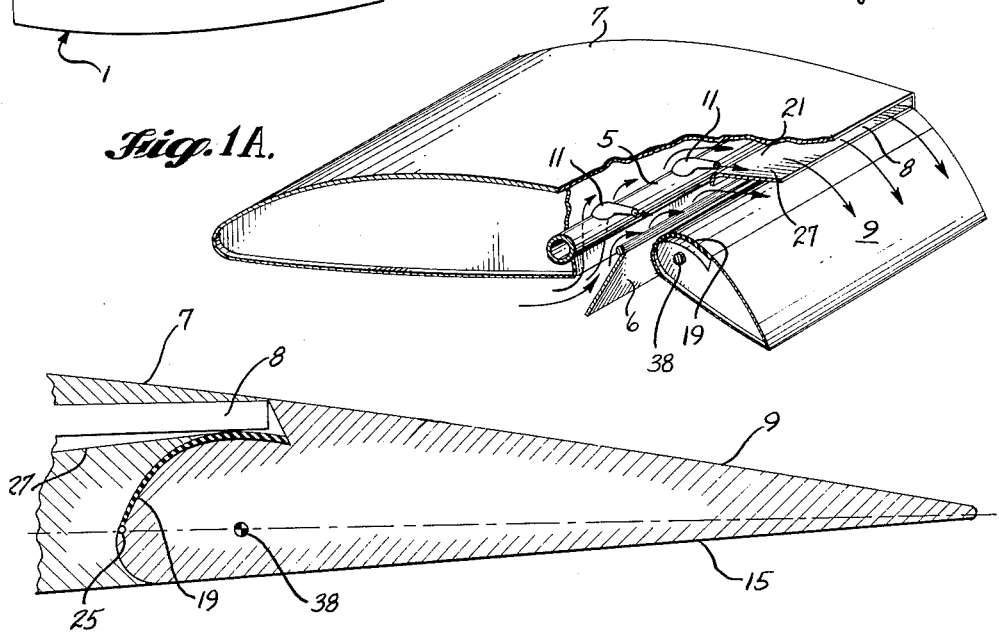
INVENTOR.
ROBERT H. STEIDL
BY *Erwin F. Adams*
ATTY.

July 5, 1966 R. H. STEIDL 3,259,341
BLOWN MOVABLE AIRFOIL
Filed May 7, 1964 2 Sheets-Sheet 2
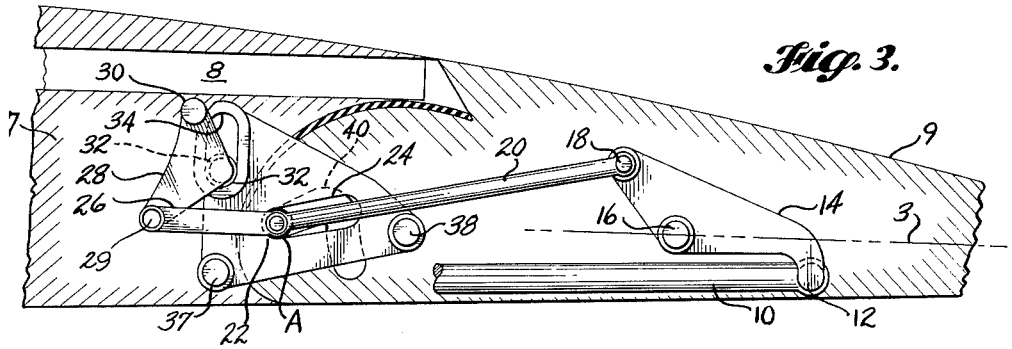
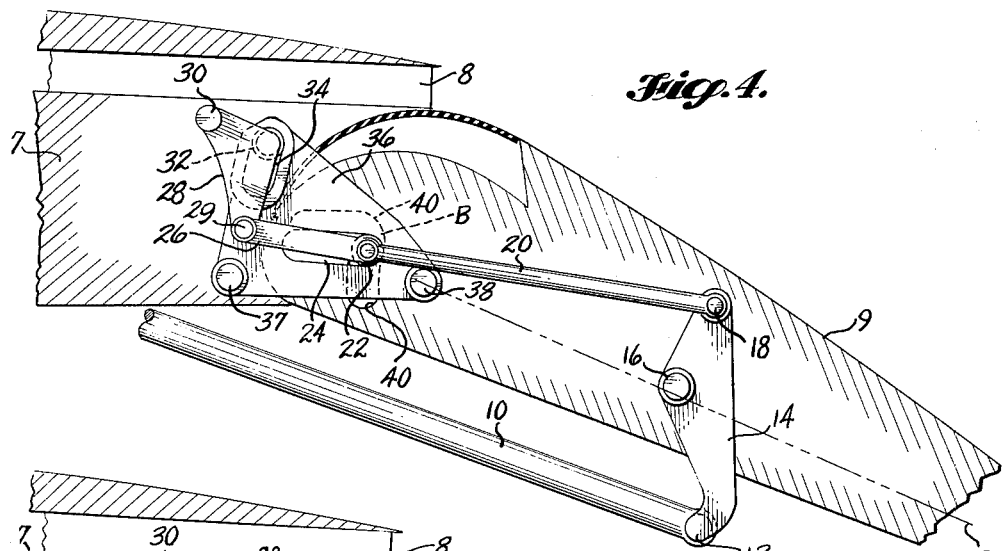
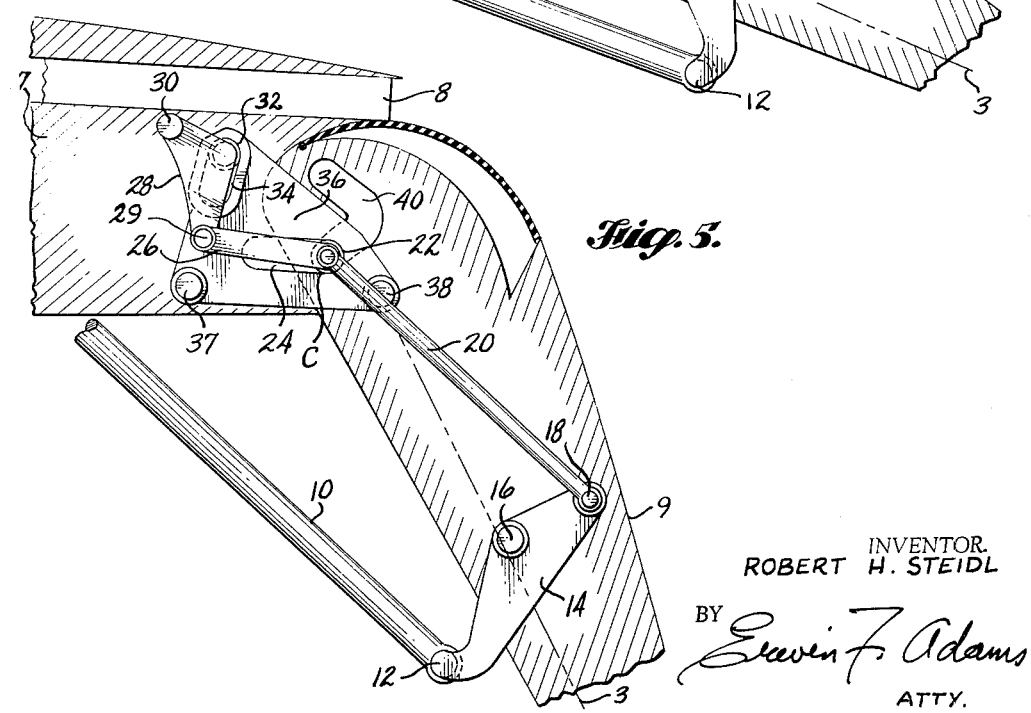
INVENTOR.
ROBERT H. STEIDL
ATTY.

United States Patent Office 3,259,341
Patented July 5, 1966

3,259,341
BLOWN MOVABLE AIRFOIL
Robert H. Steidl, Seattle, Wash., assignor to The Boeing Company, Seattle, Wash., a corporation of Delaware
Filed May 7, 1964, Ser. No. 365,642
2 Claims. (Cl. 244—42)

This invention relates to airfoil flaps and more particularly to flap actuating mechanisms and boundary layer control systems for such flaps.

The idea of boundary layer control on the surface of airfoils in order to intensify the circulation around the airfoil profile is well known. This of course facilitates flight by increasing the lift of the airfoil.

The particular object of the present invention is to provide means for movably connecting a pivotally mounted trailing airfoil relative to a main airfoil, whereby through translation and all angles of rotation of the pivotally mounted trailing airfoil with respect to the main airfoil, air from an air blowing means within the main airfoil will proceed contiguous to the upper surface of the pivotally mounted trailing airfoil. This feature contributes to the development of added lift by causing the air stream to follow more closely the hyper-sustaining portions of the profile.

Another object of this invention is to provide inlet means in combination with means for translation and rotation of a pivotally mounted trailing airfoil and air blowing means whereby large controlled quantities of air from the lower surface of the main airfoil is caused to enter an air mixing chamber within the main airfoil to therein mix with high velocity air from the air blowing means so as to provide a large mass of relatively high velocity air which is discharged contiguous to the upper surface of the pivotally mounted trailing airfoil.

Other objects and various advantages of the disclosed control mechanism will be apparent from the following detailed description, together with the accompanying drawings, which are submitted for purposes of illustration only and not intended to define the scope of the invention, reference being had for that purpose to the subjoined claims.

Briefly, the instant invention comprises means to movably connect a pivotally mounted trailing airfoil relative to a main airfoil containing air blowing means. The former means provides translation and rotation of the pivotally mounted trailing airfoil while maintaining tangential contact, through all angles of rotation, between the leading edge and upper surface of the pivotally mounted trailing airfoil and the lower edge of an air discharge opening defined by means at the trailing edge of the main airfoil.

The means for translating and rotating the pivotal trailing airfoil comprises cooperating linkage and sliding means disposed so as to be actuated by input signals from pilot operated or automatic pilot control means.

A feature of the teachings of this invention is such that in its stowed position, the upper surface of the leading edge of the pivotal trailing airfoil deflects inward into a cavity within the airfoil. This resiliently mounted portion of the leading edge comprises a hinged material which exerts a force oppositely to a deflecting force, i.e., the force exerted by the lower edge of the air discharge opening at the trailing edge of the main airfoil, as the pivotal trailing airfoil is stowed. The resiliently mounted upper surface of the leading edge of the trailing airfoil deflects into said cavity from a hinge point; upon translation aftward and concomitant rotation of the pivotal trailing airfoil, the hinged material conforms to the leading edge and upper surface contour of the trailing airfoil. During the period of translation aftward and through all angles of rotation, the hinged material maintains tangential contact with the lower edge of the air discharge opening. At all angles of rotation, therefore, a continuous upper and lower airfoil surface is provided by the above described cooperation between the main airfoil and the pivotal trailing airfoil.

A second feature of this invention provides in relation to and within the main airfoil air blowing means comprising: at least one high pressure gas distribution duct located spanwise within the main airfoil; a conduit transferring gas from a gas generator to the high pressure gas distribution duct; and, a plurality of nozzles ejecting the gas at high velocity into a single common mixing chamber defined by means within the main airfoil. The means defining the chamber within the main airfoil includes a first opening or inlet slot and a second opening or discharge slot which are continuous spanwise within the main airfoil. This continuity may be interrupted in case of structural necessities. The inlet slot, located between the under surface of the main airfoil and the pivotal trailing airfoil has a selectively movable deflector mounted on the main airfoil and actuated automatically or by pilot operated means so as to deflect and introduce large quantities of air from the under surface of the main airfoil into the mixing chamber. High velocity gas discharged by the plurality of nozzles into this large mass of air within the mixing chamber imparts high velocity to the large mass of air which is subsequently discharged, downstream through the discharge slot, contiguous to the upper surface of the trailing airfoil. The control mechanism, hereinafter to be described in detail, in combination with the resiliently mounted upper surface of the leading edge of the trailing airfoil, maintains the leading edge of the upper surface of the trailing airfoil in tangential contact with the discharge slot of the main airfoil so as to provide contiguous blow down over the upper surface of the pivotally mounted trailing airfoil.

The teachings of this invention are not restricted to any particular type of nozzles for ejecting high velocity air or to any particular shape of mixing chamber.

In the drawings:

FIG. 1 diagrammatically illustrates in section view a pivotally mounted trailing airfoil in accordance with the present invention;

FIG. 1(a) depicts a plurality of nozzles disposed spanwise within the discharge slot at the trailing edge of the main airfoil;

FIG. 2 is a schematic illustration of the pivotally mounted trailing airfoil in a stowed position in the main airfoil;

FIG. 3 is a detailed illustration of the means for movably connecting the pivotally mounted trailing airfoil, shown in the stowed position;

FIG. 4 is a detailed illustration of the connecting means of FIG. 3 shown at the end of translation and several degrees rotation of the pivotally mounted trailing airfoil; and FIG. 5 is a detailed illustration of the connecting means of FIG. 3 showing the pivotal trailing airfoil at maximum rotation.

Referring to FIGURE 1, omitting at this point any illustration of means for movably connecting a main airfoil and a pivotally mounted trailing airfoil, a pivotal trailing airfoil 9 having a pivotal point 38 is shown in its most aftward translated position and its extreme position of rotation, the upper surface of the pivotal trailing airfoil 9 being in tangential contact with the lower edge of discharge slot 8 located within the trailing edge of a main airfoil 7. The discharge slot 8 is a terminal extension of an air mixing chamber 21. The air mixing chamber 21 extends spanwise within the trailing edge of the main airfoil 7 and is formed by the upper portion of the trailing edge of the main airfoil 7, which may also house a spoiler 13, and by a structural member 27 which also extends spanwise in the main airfoil 7. Bleed gas from an engine 1, or any gas generator, attached to the main airfoil 7 by a strut 2, is conducted to a gas distribution duct 5 through a high pressure conduit 4. The distribution duct 5 discharges gas at high velocity through a series of nozzles 11, as seen best in FIG. 1(a), into the air mixing chamber 21. The view is diagrammatic and does not present the exact or total structural relationship between main airfoil 7 and trailing airfoil 9. A deflector means 6, movably mounted to the lower surface of the main airfoil 7 introduces large masses of air from the lower surface of main airfoil 7 into the mixing chamber 21. In the mixing chamber 21 the large mass of air acquires a relatively high velocity by mixing with high velocity gas from the discharge nozzles 11. The large mass of relatively high velocity air is discharged contiguous to the upper surface of the airfoil 9 from the mixing chamber 21 through the discharge slot 8.

FIGURE 2 shows the airfoil 9 in its stowed position. For illustrative purposes the means for movably connecting the trailing airfoil to the main airfoil and the air blowing means have been omitted. A resiliently mounted material 19 having a hinge point 25 comprises the leading upper surface of the airfoil 9. Although the drawing shows the material 19 as rubber, such illustration is not to be considered as exclusive. In its stowed position the airfoil 9 provides a continuous airfoil surface with the trailing edge of the main airfoil 7 while contacting the structural member 27 in a manner so that on translation of the airfoil 9, the resilient material 19 will bias outward from the position shown to form a normal contour surface of the leading upper edge of the airfoil 9. Thereafter, upon rotation about a hinge point 38, the resilient material 19 will maintain tangential contact with the structural member 27 which forms the lower surface of the discharge slot 8 and air mixing chamber 21.

Referring now to FIGURES 3, 4 and 5, the means for movably connecting the pivotal mounted trailing airfoil 9 to main airfoil 7 is illustrated in its sequential operating positions. Air blowing means have been omitted from FIGURES 3, 4 and 5 for clarity, as are the exact structural relationships between the main airfoil and the trailing airfoil. Actuator arm 10 is connected to drive a first linkage means which includes a first bell crank 14 pivotally mounted at 16 to the airfoil 9, and a first link 20 connected to first bell crank 14 by pin 18. A first follower 22 is disposed to slide in a first track means 24 and a second track means 40. The actuator arm 10 might commonly be actuated by mechanical or hydraulic means (not shown) under pilot manual or automatic control. Upon actuation of the actuator arm 10 the first bell crank 14 rotates clockwise (as seen in FIGS. 3, 4 and 5) about pivot 16. This rotation of bell crank 14 translates the first link 20. The link 20 interconnects bell crank 14 and the follower 22 which is disposed to slide concurrently within both track 24 within a truss support 36 and track 40 within the trailing airfoil 9, the truss support 36 being pivotally mounted at 37 to the main airfoil 7 and hinged to the trailing airfoil 9 at a hinge point 38. The second track means 40 within the trailing airfoil 9 has a programmed pattern of travel for the first follower 22. It is this programmed pattern which determines the amount of translation and rotation that the trailing airfoil 9 will undergo upon further actuation of arm 10.

A second linkage means, disposed to be driven by follower 22, comprises: a second bell crank 28; and, a second link 26. Link 26 interconnects follower 22 and bell crank 28, through pin 29. A second follower 32 is integrally connected with the bell crank 28 which is pivotally mounted to the main airfoil 7 at a pivot 30. As the link 26 is caused to translate by first link 20 driving follower 22, second bell crank 28 rotates about its pivot 30 and causes second follower 32 to travel in a third track 34 within the truss support 36. As follower 32 moves within track 34 in truss support 36, the force transmitted by link 20 and 26 through follower 32 against the aftward side of track 34 causes truss support 36 to rotate clockwise about its pivot 37 thereby causing follower 22 to continue its movement within track 40. Thus translation of the trailing airfoil 9 is effected as the follower 22 moves from its position in track 40, as seen in FIG. 3, to the opposite end of track 40, as seen in FIG. 4, by force transmission from arm 10 through support truss 36 and hinge 38 to the airfoil 9.

Turning next to a detailed consideration of FIGS. 3, 4 and 5 separately, FIG. 3 presents an illustration of the means for movably connecting trailing airfoil 9 to main airfoil 7 as taught by this invention in combination with, but not shown within FIG. 3, the blowing means previously discussed. Notice with regard to track 40, follower 22 is at what will be referred to as "one end" of track 40, having reference designation A in FIG. 3. Upon actuation of arm 10, bell crank 14 begins to rotate about its pivot point 16 thereby translating link 20 and causing follower 22 to follow concurrently within track 24 and track 40. As the follower 22 travels within track 40 from A in FIG. 3 to the knee of track 40, designated point B in FIG. 4, follower 32 travels within track 34 causing rotation of truss support 36 about pivot 37 with concomitant translation of airfoil 9. Again, the period in which follower 22 has displaced from point A to FIG. 3 to point B of FIG. 4, link 26 has translated causing follower 32 to travel within track 34 in truss support 36 from a position seen in FIG. 3 to the end of track 34 as seen in FIG. 4. Thereafter, upon continued actuation of arm 10, second follower 32 remains fixed in the position held in FIG. 4; this latter fixation, coupled with bell crank pivot 30 and support truss pivot 37, maintains support truss 36 in a rigid fixed position. As actuation of arm 10 proceeds, rotation of trailing airfoil 9 occurs about point 38. During further rotation about pivot 38 as follower 22 moves in track 40 toward point C as seen in FIG. 5, follower 22 continually biases against the aftward side of track 40 and support truss 36 remains fixed by the combination described above. This continued movement of follower 22 is dependent upon continued actuation of arm 10, which provides sufficient moment about hinge 38 to rotate the trailing airfoil 9. Once point C as seen in FIG. 5 is reached by follower 22 the maximum camber, provided by the pivotally mounted trailing airfoil 9 having a programmed track 40 as herein illustrated, is reached.

By changing the program shape of the track 40, varying degrees of rotation of the trailing airfoil 9 can be accomplished both simultaneously with and independently of translation of the trailing airfoil 9. Through all angles of rotation the yieldable spring material 19 of the leading upper edge of trailing airfoil 9 remains in tangential contact with the structural member 27 which forms the lower surface of air mixing chamber 21 and discharge slot 8.

This invention is not restricted to any certain type of linkage or any one type of bell crank but can comprise any of the known methods of linkage construction in the art.

Since numerous changes may be made in the above apparatus and different embodiments may be made without departing from the spirit thereof, it is intended that all matter contained in the foregoing description or shown in the accompanying drawings shall be interpreted as illustrative and not in a limiting sense.

I claim as my invention:

1. In an aircraft wing having a main airfoil and a pivotal trailing airfoil, means defining a chamber within said main airfoil and forming a discharge slot at the trailing edge of said main airfoil, means for blowing air through said chamber, and means for translating and rotating said pivotal trailing airfoil so that the leading upper surface of said last-mentioned airfoil maintains tangential contact with the lower edge of said discharge slot, wherein said means for translating and rotating said pivotal trailing airfoil includes:
- (A) an actuator arm;
- (B) first linkage means interconnecting said actuator arm and a second linkage means, said first linkage means including
   - (1) a first follower disposed to slide concurrently in
      - (a) a first track within a truss support said truss support pivotally interconnecting said main airfoil and said pivotal trailing airfoil, and
      - (b) a second track within said pivotal trailing airfoil; and,
- (C) said second linkage means having:
   - (1) a second follower disposed to slide in,
      - (a) a third track within said truss support.

2. The combination defined in claim 1 wherein the leading upper surface comprises a resiliently mounted material.

References Cited by the Examiner
UNITED STATES PATENTS

| | | | |
|---|---|---|---|
| 2,478,793 | 8/1949 | Trey | 244—42 |
| 2,940,690 | 6/1960 | Wood | 244—12 |
| 2,978,207 | 4/1961 | Davidson | 244—42 |
| 3,045,947 | 7/1962 | Bertin et al. | 244—12 |
| 3,092,354 | 6/1963 | Calderon | 244—42 X |
| 3,203,647 | 8/1965 | Calderon | 244—42 |

MILTON BUCHLER, *Primary Examiner.*

B. BELKIN, *Assistant Examiner.*